Oct. 24, 1933. F. L. BORCHERT 1,931,787
WRAPPING MECHANISM
Original Filed Nov. 10, 1923 7 Sheets-Sheet 1
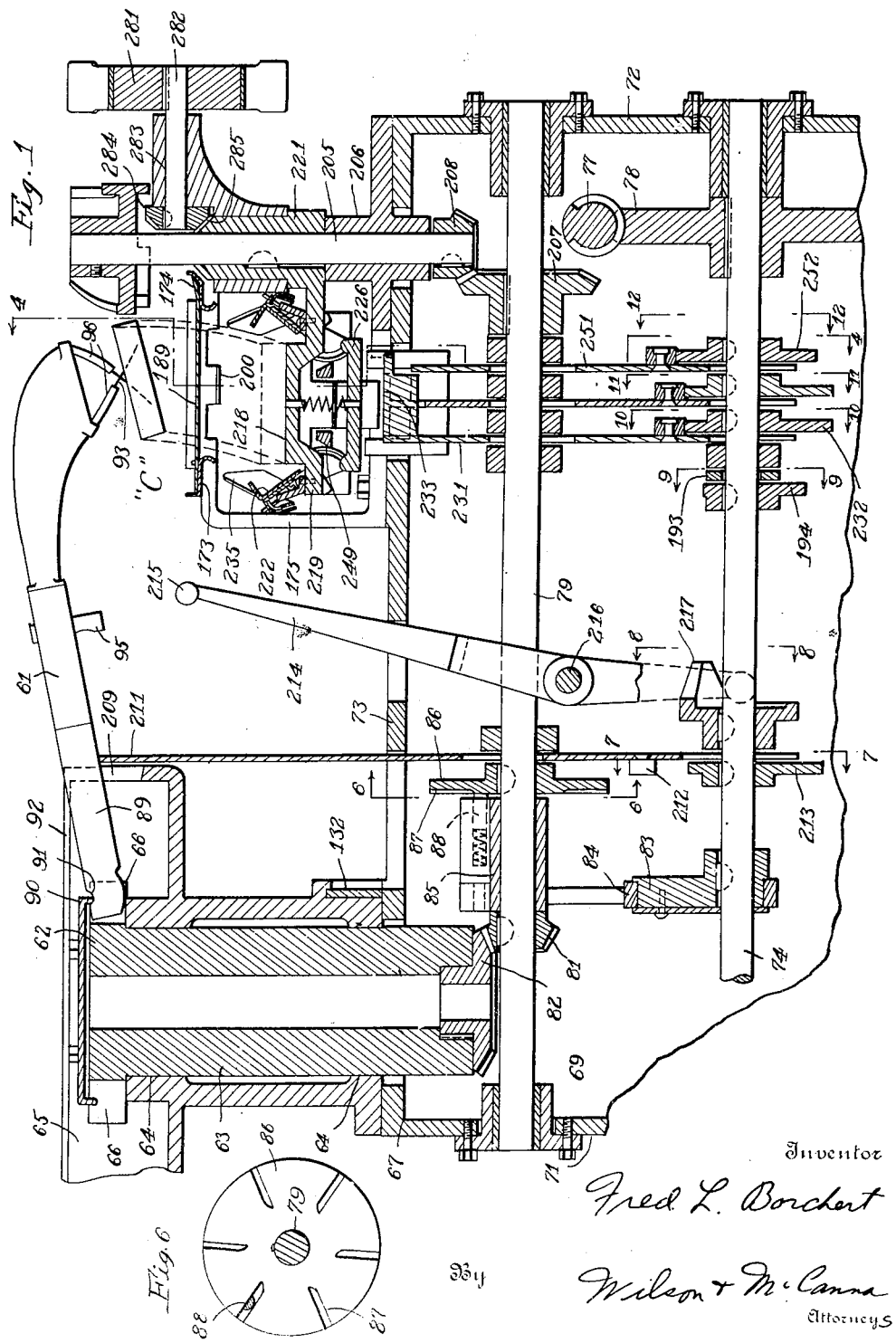
Inventor
Fred L. Borchert
By Wilson & McCanna
Attorneys Oct. 24, 1933.   F. L. BORCHERT   1,931,787
WRAPPING MECHANISM
Original Filed Nov. 10, 1923   7 Sheets-Sheet 2
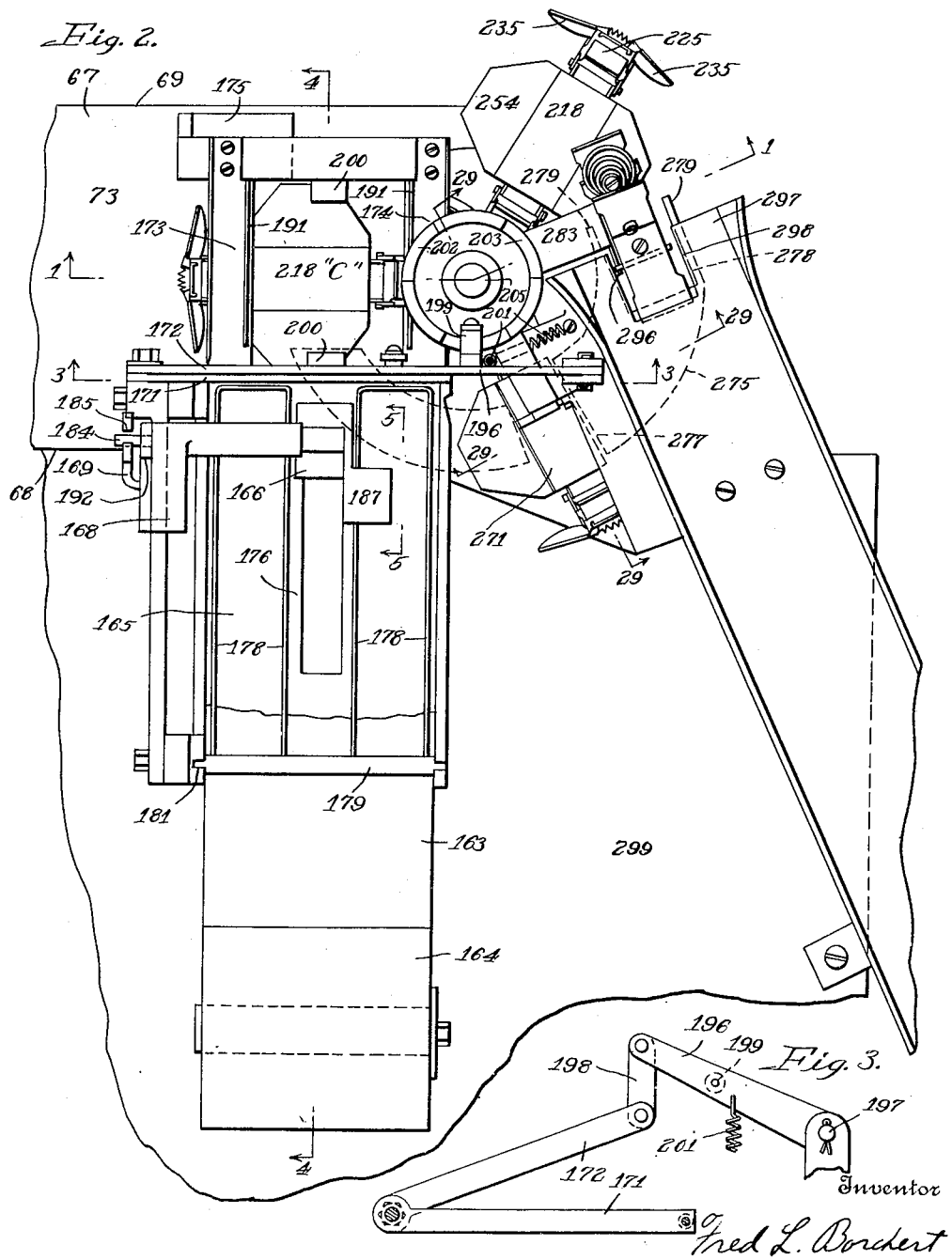

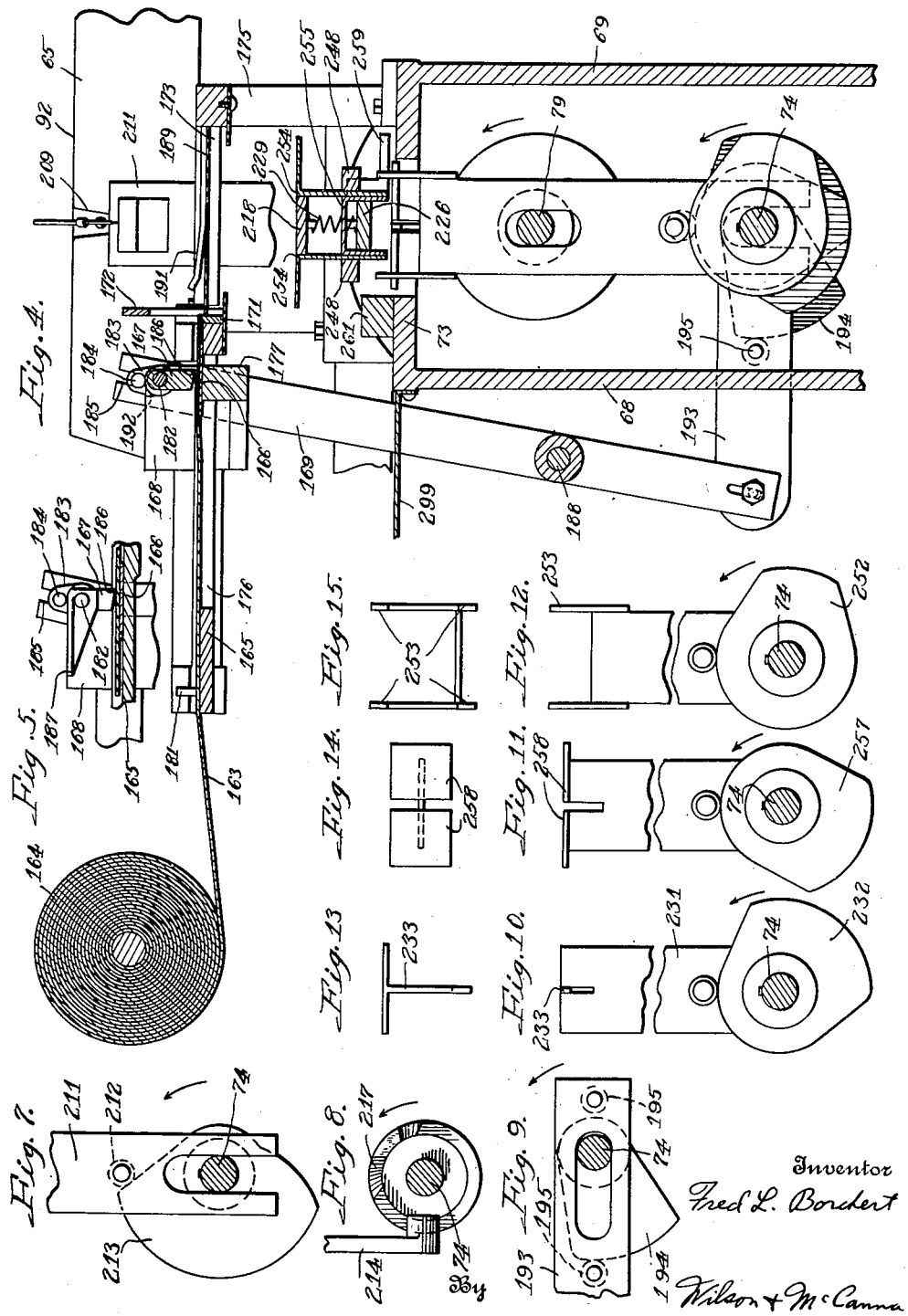

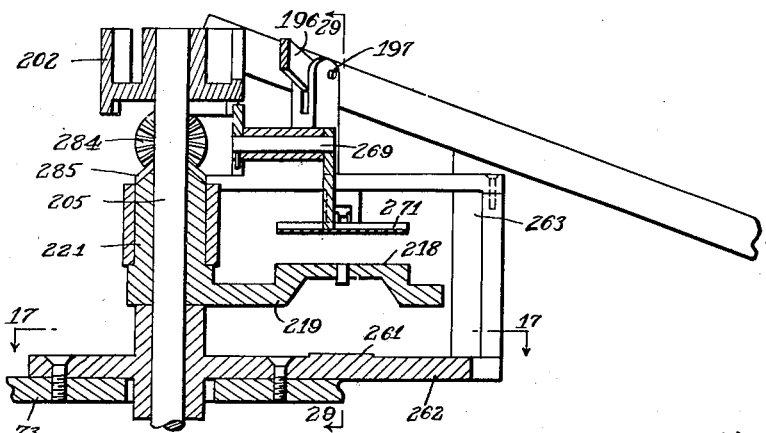
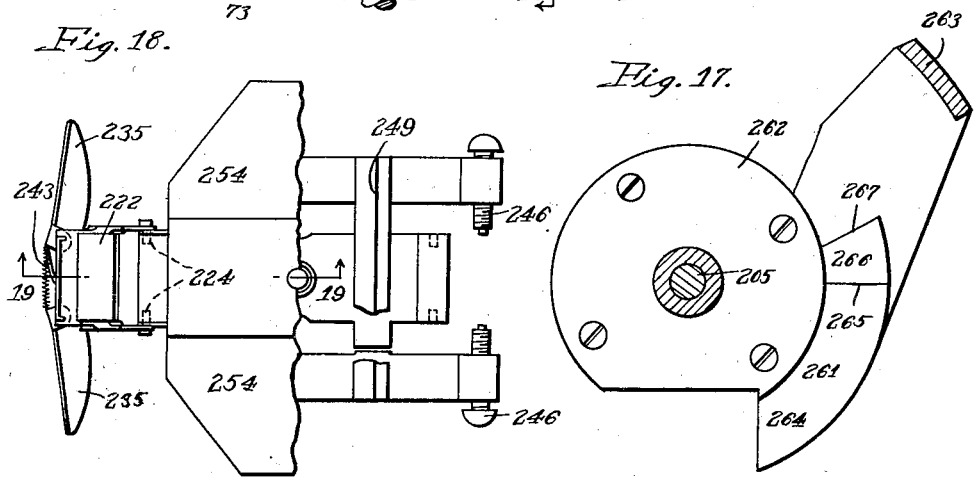
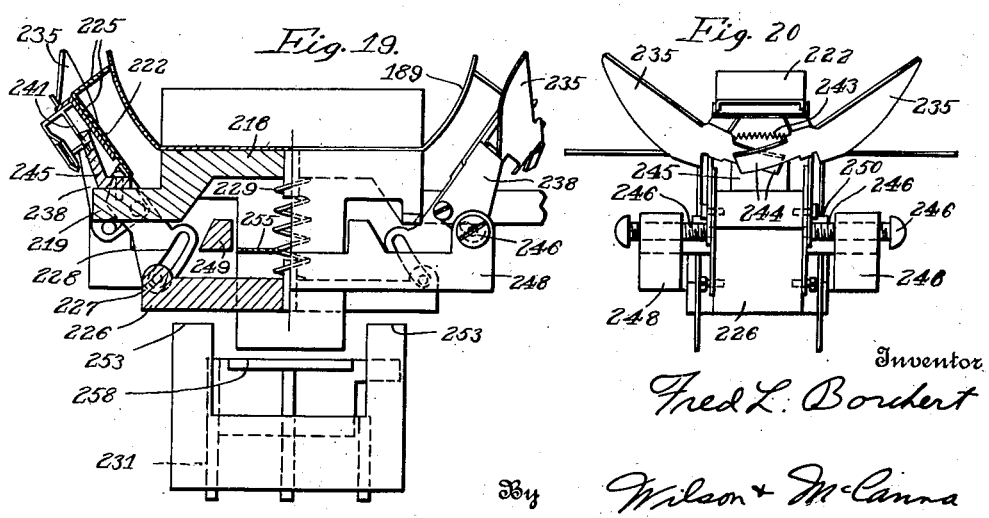

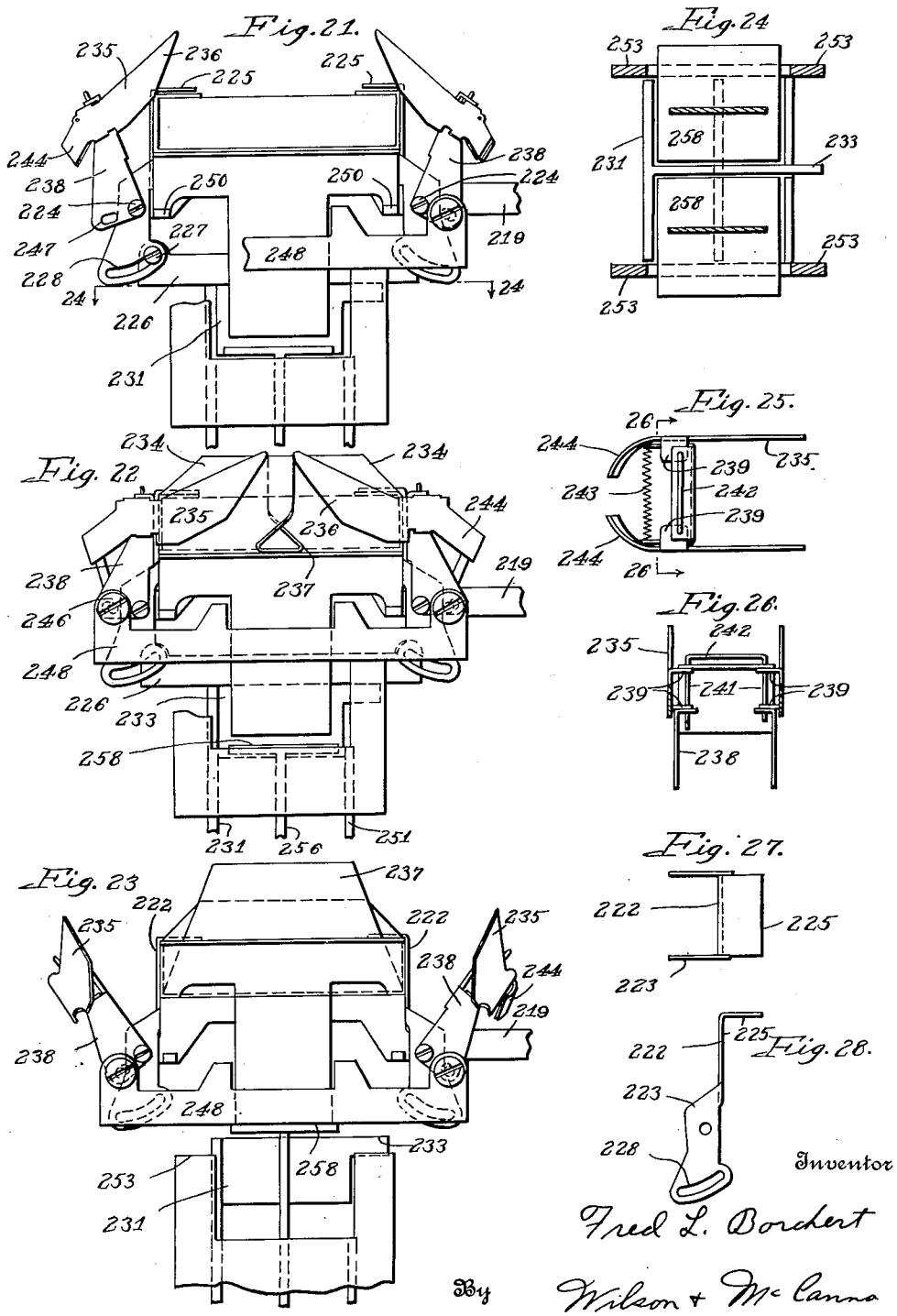

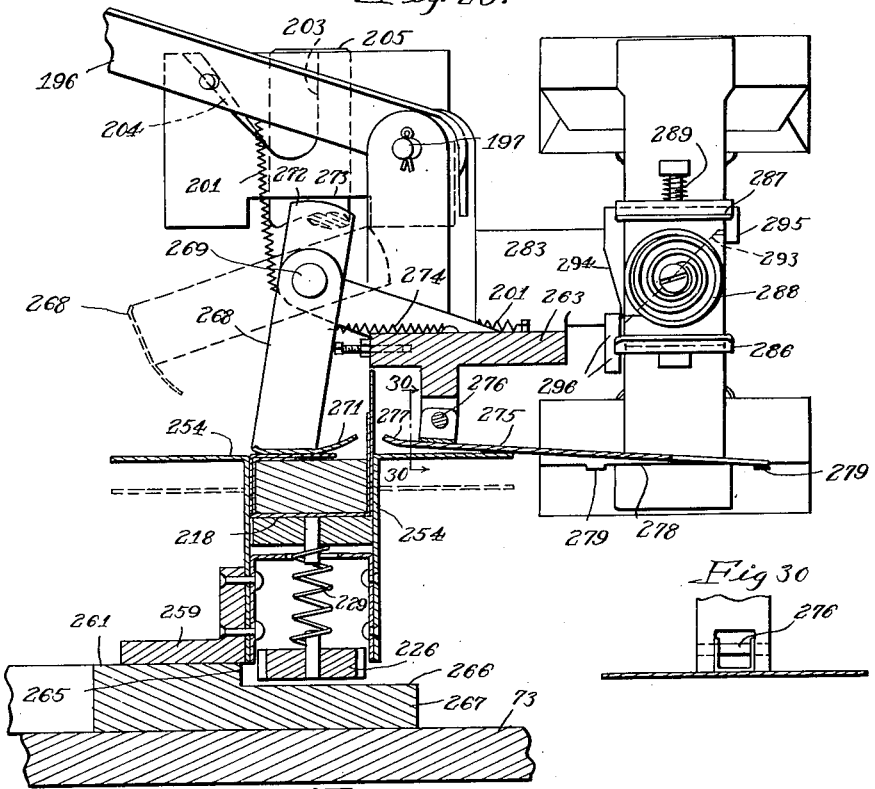

Oct. 24, 1933.    F. L. BORCHERT    1,931,787
WRAPPING MECHANISM
Original Filed Nov. 10, 1923    7 Sheets-Sheet 7

Inventor
Fred L. Borchert
By  Wilson + McCanna
Attorneys

Patented Oct. 24, 1933

1,931,787

UNITED STATES PATENT OFFICE 1,931,787

WRAPPING MECHANISM

Fred L. Borchert, Rockford, Ill.

Original application November 10, 1923, Serial No. 673,905. Divided and this application June 28, 1929. Serial No. 374,317

13 Claims. (Cl. 93—7)

This is a division of my application Serial No. 297,348, filed August 3, 1928, which in turn is a division of my application Serial No. 673,905, filed November 10, 1923, now Patent No. 1,687,707 granted October 16, 1928, for confection making machine. My invention while applicable to the wrapping of various articles, is especially designed for wrapping confections such as chocolate coated bars. The machine disclosed in my Patent No. 1,687,707 automatically cuts a cake or slab of ice cream into small blocks or bars for individual eating, coats the bars, and then wraps the coated bars. The wrapped ice cream confections are then ready for distribution and sale, it being customary, however, to keep them at a low temperature until delivered to the customer. My patent above mentioned, relates to the manufacture of the confections, especially to the cutting and coating hereof. The cutting mechanism per se is claimed in my divisional application Serial No. 198,617 filed June 13, 1927, now Patent No. 1,687,708, granted October 16, 1928, and the work holding and transferring mechanism is claimed in my divisional application Serial No. 297,349 filed August 3, 1928.

My application Serial No. 297,348, above mentioned, of which this is a direct division, relates to a combined machine for performing the operations of cutting, coating and wrapping.

The present application relates more particularly to the mechanism for wrapping various articles and commodities such as ice cream, candy, cheese, cake, sugar, soap, etc. in bar, lump and special forms.

One of the objects of the present invention is to provide mechanism for economically wrapping articles such as chocolate coated ice cream bars.

Another object is to provide mechanism for satisfactorily wrapping articles having irregular shapes or which in the course of production may vary in shape. In this connection I have also aimed to provide mechanism for wrapping coated articles which will not crack or mar the coating in the event of irregularities in the shape or proportions of the articles.

A further object is to provide mechanism for independently wrapping each article by a series of wrapping operations performed while the article is at rest, as at a wrapping station, as distinguished from passing the article and wrapper through channels, chutes, or tubes in which the wrapping operations are performed in the progress of travel from station to station.

Still another object is to provide improved mechanism for completely wrapping an article by folding the ends and sides of a wrapper and tucking in the corners in a particularly advantageous manner as will be described more fully hereinafter.

Other objects and attendant advantages will be appreciated by those skilled in this art as the invention becomes better understood by reference to the following description and considered in connection with the accompanying drawings, in which—

Figure 1 is a fragmentary vertical sectional view through the confection making machine shown in my Patent No. 1,687,707 above mentioned, embodying the wrapping mechanism of the present invention; this being an enlarged section taken substantially on the line 1—1 of Fig. 2;

Fig. 2 is a top view of the wrapper-feeding mechanism and the wrapping mechanism shown in Fig. 1;

Figs. 3, 4 and 5 are sectional views taken substantially on the lines 3—3, 4—4 and 5—5, respectively, of Fig. 2, the vertical section of Fig. 4 being taken on the line 4—4 of Fig. 1;

Fig. 6 is a section taken on the line 6—6 of Fig. 1;

Figs. 7, 8, 9, 10, 11 and 12 are sections taken substantially on the lines 7—7, 8—8, 9—9, 10—10, 11—11 and 12—12, respectively, of Fig. 1, showing in the last three figures the upper ends of the lifter bars;

Figs. 13, 14 and 15 are top views of the lifter bars shown in Figs. 10, 11 and 12, respectively;

Fig. 16 is a section taken substantially on the line 16—16 of Fig. 2, with part of the wrapping mechanism removed;

Fig. 17 is a horizontal section taken on the line 17—17 of Fig. 16;

Fig. 18 is an enlarged top fragmentary view of one of the wrapping units or boxes;

Fig. 19 is a side view of said wrapping unit, partly in vertical section as taken on the line 19—19 of Fig. 18, showing the upper end of the cam lifted bars;

Fig. 20 is an end view of said wrapping unit.

Figs. 21, 22, and 23 are side views of one of the wrapping units showing the parts at different stages of the wrapping operation, as will be explained more fully hereinafter;

Fig. 24 is a horizontal section taken substantially on the line 24—24 of Fig. 21;

Fig. 25 is a top section of one of the pairs of tucker fingers forming part of said wrapping unit;

Fig. 26 is a section taken on the line 26—26 of Fig. 25;

Figs. 27 and 28 are top and side views, respectively, of one of the end folders used in said wrapping unit;

Fig. 29 is an enlarged vertical section taken substantially on the line 29—29 of Fig. 2;

Fig. 30 is a section taken on the line 30—30 of Fig. 29.

Figure 39:
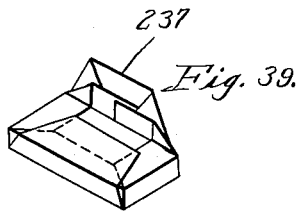
Figure 37:
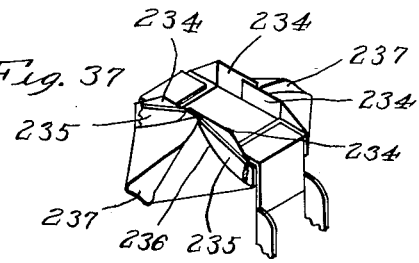
Figure 40:
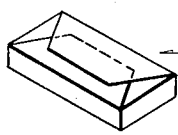

Fig. 31 is an end view of the package-discharging means showing the relation of the delivery chute thereto;

Fig. 32 is a face view of one of the gripper plates forming part of said package-discharging means;

Fig. 33 is a fragmentary view showing the action of one of the units of said package-discharging means at one stage in its operation; and Figs. 34 to 40 inclusive, are perspective views showing different stages in the wrapping of the bar, Fig. 40 showing the completely wrapped bar.

While my invention is applicable to the wrapping of various commodities as mentioned above, it is in the present instance embodied in a machine especially designed for the manufacture and wrapping of confection bars, such for example as ice cream bars or blocks. It should be understood that in the use of the terms "bar" or "block" applicant contemplates any material or articles irrespective of their size or shape adapted to be handled, worked or wrapped by apparatus embodying the invention claimed herein.

Reference may be made to my Patent No. 1,687,707 for a detailed description of the construction and operation of the entire machine. However, I will here outline briefly the cycle of operations performed by said machine with respect to a single bar. Its purpose is to cut bars from a brick or slab of ice cream, coat the bars with an edible substance such as chocolate, and wrap them in suitable wrappers ready for sale. The machine cuts bars from the slab, feeds them in succession to a loading or receiving station at which each bar is picked up by an impaling device referred to as a picker arm. A series of these picker arms, twelve in the present instance, are carried on a head, which will be indexed, moving the picker arms in succession from station to station. Each picker arm picks up a bar at the loading station and carries it by one or more indexing movements to a coating station, at which the bar is lowered into a bath of chocolate and is then raised, permitting the surplus chocolate to drip off, and that adhering, to set or harden. During succeeding indexing movements, the coating on the bar (still carried by its picker arm) will harden, and when the bar reaches a wrapping or discharging station it will be delivered from the picker arm onto a wrapper. This wrapper has been fed from a strip or coil roll to said wrapping station and cut off. The bar and its wrapper will then be acted upon by a wrapping mechanism which folds in the ends of the wrapper, tucks in the corners of the side portions and then folds the sides over the tucked-in portions and the top of the bar, thus completely wrapping the bar. The wrapped bar will then be discharged, as for example, into a delivery chute. The foregoing operations are all performed automatically in predetermined timed relation, a series of bars being worked upon at all times, and a completely wrapped bar being delivered at each indexing movement of the head. In the present machine, there are three wrapping units or boxes carried on a head which indexes in timed relation with the picker arm head, but this is not essential to the invention as a single wrapping unit may be used.

Referring now to Fig. 1, the picker arms 61 (only one of which is shown in the present drawings) are carried in circumferentially spaced, radiating relation by a head or carrier 62. The loading, coating and wrapping stations are circumferentially spaced around the head, only the discharging station "C" being here shown in Figs. 1 and 2. The head 62 will be indexed in step by step movements in a clockwise direction viewing said figure, causing the picker arms to be moved in succession from station to station, it being noted that the bars harden in the period between the coating and the wrapping stations.

Referring to Fig. 1 it will be observed that the head has a vertical column 63 revoluble in bearings 64 in a stationary cam casting designated generally by 65, and rests at its upper end on said casting; the upper end of the head having radial slots 66 in which the picker arms are mounted, as will be presently more fully described. Said cam casting 65 is fixed to the top of the main frame designated generally by 67, which has front and back walls 68 and 69, end walls 71 and 72 and a top wall 73.

The mechanism which indexes the head 62, comprises a main drive shaft 74 journaled in the frame and continuously driven by suitable means, such as an electric motor (not shown), connected to said shaft through the agency of a worm and gear 77 and 78 respectively, a secondary shaft 79 connected to the head by bevel gears 81 and 82 having a one to two ratio, and means operative between the shafts 74 and 79 for intermittently imparting a partial rotative movement to the latter. This means in the present instance consists of an eccentric 83 fixed to the shaft 74 and connected by a band 84 to a rocker arm 85 loose on the shaft 79, a ratchet toothed disk 86 fixed to the shaft 79 and having six equally spaced ratchet teeth 87 (Fig. 6), and a spring-pressed pawl or dog 88 carried by the rocker arm and adapted to engage said teeth. Upon each complete revolution of the main driving shaft 74 in a counter-clockwise direction viewing the right hand end of Fig. 1, the dog 88 which is in engagement with one of the teeth 87 will be drawn downwardly during the first half revolution of the eccentric 83 until it is carried into engagement with the face of the next lower tooth, and upon the succeeding half revolution of the eccentric 83, the dog will be moved upwardly, imparting rotative movement to the disk 86 in a clockwise direction viewing Fig. 6 for one-sixth of a revolution, and correspondingly imparting a movement of thirty degrees or one-twelfth of a revolution to the head 62, owing to the one to two ratio of gears 81 and 82. It will be thus noted that the secondary shaft 79 and parts connected thereto will remain at a standstill during one-half of a revolution of the main shaft 74, and will be moved 60 degrees during the second half revolution of said main shaft, this being repeated, causing the head 62 and other parts described hereinafter to be intermittently indexed in step-by-step movements for advancing the picker arms to the several stations.

Each picker arm or work holder 61 comprises a shank 89 adapted to be inserted in one of the slots 66 as shown in Fig. 1, with a recess 91 engaged beneath a retaining plate 90 fixed to the top of the head 62. Each picker arm rests intermediate its ends on one of several supports, thereby holding the outer end of the picker arm, which is adapted to carry a bar, at the desired elevation. During the greater part of the operation the picker arms ride intermediate their ends on the top edge 92 of the cam casting which edge is shaped to provide cam surfaces which cause the outer end of the arms to be lowered and raised for picking up a bar, dipping it in a coating and depositing the coated bar at the wrapping station. In the present case the coated bar is deposited directly onto a wrapper in the wrapping mechanism.

The arm 61 is equipped, preferably, with picking or impaling elements which will penetrate and carry a comparatively soft bar without marring it and which leave a maximum surface of the bar exposed for coating. In the present embodiment, this means (claimed in my application Serial No. 297,349) comprises a pair of flexible wire fingers or prongs 93 slidably mounted in the outer end of the picker arm and attached to a slide 95 adapted to be moved lengthwise of the shank for advancing and retracting the fingers or picker elements. Said wire fingers 93 are guided at their outer ends in tubular extensions 96 so arranged that the wires will cross in close priximity and be projected in diverging relation into a bar, thus impaling it. The bar may now be carried by the picker arm or holder from station to station. In Fig. 1 the picker arm has been moved to the wrapping station and is about to deposit a bar onto a wrapper 189.

Wrappers may be positioned on the wrapping mechanism either by hand or automatically. In the present instance the wrappers are automatically fed to said wrapping mechanism from a strip and cut off. As shown in Figs. 2 and 4, the wrapper strip 163, taken from a roll 164 suitably supported on the frame, passes over a stationary support 165 and between fixed and movable gripping elements 166 and 167 carried by a slide 168, which is adapted to be reciprocated by a lever 169 for feeding the leading end of the wrapper between fixed and stationary shear blades 171 and 172 respectively, and onto a wrapper table formed by the separated parts 173 and 174, shown in section in Fig. 1. Said support and table parts are carried on and above the main frame by suitable means such as a bracket 175. The wrapper support 165 has a longitudinal opening 176 for clearance of the gripper element 166 and its supporting part 177 which connects this element to the slide 168. Wire riders 178 rest or float on the wrapper at each side of the opening 176 for preventing the wrapper from buckling. These riders may be supported in any suitable manner, and at points are attached to a cross piece 179, which likewise rests or floats on the wrapper and is retained at its ends in vertical guide slots 181 in the side walls of the support 165. The movable gripping element 167 is fixed to a shaft 182 mounted on the slide 168, which shaft carries a fixed crank arm 183, the pin 184 of which is disposed in a slot 185 in the upper end of the lever 169. The movable gripping element 167 is beveled on its lower end, providing a gripping edge 186, and has on the side opposite from said gripping edge a finger 187 adapted to be depressed by hand at the will of the operator for withdrawing said gripping edge from the paper. As shown in Fig. 4, the lever 169 which is pivoted on the frame at 188, has been swung in a clockwise direction to the full limit of its feed stroke, thereby feeding the leading end 189 of the wrapper onto the wrapper table 173—174 and beneath the wire hold-down fingers 191 above said table. Upon the back stroke of the lever 169, the thrust of the lever on the pin 184 will swing the crank arm 183 in a counter-clockwise direction viewing Fig. 4, thereby likewise swinging the gripping element 167 and withdrawing its edge 186 from the wrapper. Thus on the back stroke, the gripping elements 166 and 167 pass idly beneath and above the wrapper. Immediately upon reversal of the stroke, the forward pressure of the lever 169 will be transmitted to the gripping element 167, swinging it in a clockwise direction so as to cause its gripping edge to press down on the wrapper and take hold of it with a pressure which increases with the resistance of the wrapper to move with the gripper elements. It will be observed at this point that the lever 169 by reason of its connection through the crank arm 183 and shaft 182 with the slide 168, moves the latter in the feed and return strokes, said arm 183 being limited in its back movement by striking a stop 192 on the slide. These feed and return strokes are imparted to the lever 169 by a link 193 connected to the lower end of the lever and operated by a cam 194 (Figs. 4 and 9) fixed to the main drive or cam shaft 74, the link being suspended at one end of said shaft 74 and carrying cam follower rollers 195.

After having been fed to the wrapper table the wrapper 189 will be severed from the strip 163 by the shear blades 171 and 172. The movable blade 172 is operated by a lever 196, (Figs. 2, 3 and 29), pivotally mounted at 197 on a stationary part and connected by a link 198 to the blade. This lever carries a roller 199, which is held by a spring 201 against the top end of a rotary cylindrical cam 202. This end of the cam has four equally spaced depressions 203 into each of which the roller drops abruptly and will then be raised by the inclined cam portions 204 when the cam is rotated. The cam 202 is operated intermittently by reason of its being mounted on a shaft 205 driven by gears 207 and 208 from shaft 79. See Figs. 1 and 2.

Each time the roller 199 drops into a depression 203 in cam 202, the blade 172 will obviously be lowered in a quick shearing action, thereby severing the wrapper. The link 198 may be swung in a clockwise direction about its pivot on the lever 196 (viewing Fig. 3) until the pivotal connection between the blade 172 and said links lies above a line between the lever pivots, thereby holding the blade in an inoperative position. The cam 202 is so timed that the blade 172 will be operated in a shearing action after each wrapper has been fed to the wrapper table.

Just after the wrapper has been cut as described, a picker arm with a coated bar having been moved into registration with the wrapper, will be lowered so as to bring the bar down onto the wrapper and through the opening between the table parts 173 and 174, thus carrying the wrapper ahead of it and into a wrapping box or unit, which will be presently described. Inwardly projecting guides 200 at the sides of the wrapper table between the table parts 173 and 174 intercept the intermediate portions of the wrapper in its downward passage to the platen and serve to prevent the wrapper from tipping endwise. When the bar and wrapper have been so positioned, the picker fingers will be withdrawn from the bar and the picker arm will be raised. To this end, the cylindrical wall of the cam casting 65 is cut away as at 209 for free vertical movement of the picker arm. When each arm reaches this passage, it will ride onto the upper end of an upstanding cam bar 211 which carries a roller 212 following a cam 213 (Fig. 7) fixed to the shaft 74. This cam is so shaped and positioned on said shaft as to lower and raise each picker arm and its coated bar at the proper times. The picker fingers will be withdrawn from the bar when the latter is in the lowered position by the action of a lever 214 (Fig. 1), the upper end 215 of which is normally in a position beyond the outer side of the picker finger slide 95, so that when the latter is lowered into the path of said lever end 215, the lever 214 may be swung in a counter-clockwise direction about its pivot 216 as the same appears in Fig. 1, for withdrawing the picker fingers. A cam 217 (Fig. 8) fixed to the shaft 74, operates the lever 214 for withdrawing the picker fingers, and when the lever is released by the cam, will be returned to said normal position by any suitable means, at present by gravity.

The wrapping mechanism will now be described. In the present machine, I have provided three wrapping units or boxes, each similar in construction and operation, mounted in equally spaced relation to index about the vertical shaft 205 previously mentioned, which is journaled in a bearing casting 206 fixed to the top wall of the frame as best shown in Fig. 14. This shaft is adapted, as stated before, to be indexed by rotative movement of the shaft 79 by means of bevel gears 207 and 208 having a ratio of two to one. Inasmuch as the shaft 79 is given a rotative movement of one-sixth of a revolution to each complete revolution of the main drive shaft 74, the shaft 205 will be moved 120 degrees or one-third of a revolution upon each indexing movement. In other words, the picker arm head 63 and the shaft 205 are simultaneously indexed, the former one-twelfth of a revolution and the latter one-third, for the purpose of bringing a wrapping unit and a picker arm carrying a coated bar into registration. This arrangement, however, is not essential as a single wrapping unit may be used in place of the three shown herein for wrapping each bar instead of every third bar as is done at present. The mechanism of each wrapping unit is assembled around a horizontal table or platen 218 formed integrally with a platen frame 219, these platen frames being carried in radial spoke-like relation by and about a hub 221.

Figure 35:
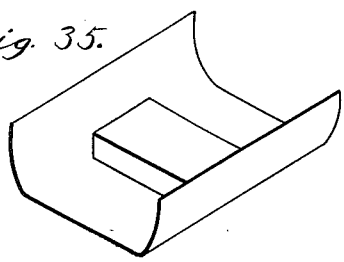
Figure 36:
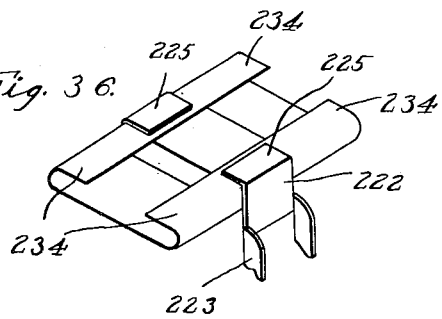

Inasmuch as the wrapping units are similar in construction and operation, a description of one will suffice. Referring more particularly to Figs. 1, 4 and 18 to 28 inclusive, it will be observed that the platen proper 218 has a flat top substantially the same length and width as the bar to be wrapped. Mounted upon or associated with the platen frame are devices for folding the wrapper about the bar in the course of wrapping it, these devices being operated by cams on the shaft 74, as will be described later, when the wrapping unit is located below the wrapper station "c." On each end portion of the platen frame is pivotally mounted an end folder member designated generally by 222 shown in detail in Figs. 27 and 28. Each end folder has in the present instance side members 223 straddling the platen frame 219 and pivotally connected thereto by a screw 224. The upper end of each end folder is shaped to provide angular folding portions 225; and means provided for rocking the end folder members on their pivots in a folding and retracting stroke. This comprises a part 226 disposed directly below the platen between the sides 223 of each end folder and carrying screws 227, each of which passes through a cam slot 228 in the lower end of the adjacent side 223. A spring 229 interposed between the platen 218 and the part 226, best shown in Fig. 19, normally urges the latter to a lowermost position, so as to hold the end folders in the retracted or open position shown in this figure. The wrapper 189 and a coated bar are here shown on the top of the platen on which they have been placed by the picker arm as described above, it being noted that the ends of the wrapper have been partially folded in by reason of their contact with the inner edges of the folding portions 225. This position of the bar and wrapper is also shown in Fig. 35. Upon raising the part 226, the screw pins 227 will swing the end folders on their respective pivots, thereby swinging the upper folding portions thereof inwardly, to the position shown in Fig. 21, so as to fold the ends of the wrapper down over the top of the bar. This folding operation is also shown in Fig. 36. A lifter bar 231 operated by a cam 232 (Fig. 10) fixed to the shaft 74 serves to lift the part 226, it being noted, Figs. 10 and 13, that this lifter bar has a T-shaped head 233 for holding the part 226 level, so as to operate both end folders alike.

The next folding operation to be performed is to tuck in the upper corners 234 of the side portions of the wrappers, this being done by two pairs of side tuckers 235. Each tucker has a flat finger portion, the under edge 236 of which is beveled so that when the finger is swung inwardly toward the bar, it will engage the top corner portion 234 of the wrapper and carry it against the side of the bar, leaving the intermediate side portion 237 of the wrapper extending, it being noted (viewing Fig. 37) that the corner portions 234 of the wrapper will be held flat against the sides of the coated bar and that the side portion of the wrapper pulled in by these tuckers will crease substantially along the lower tapered edge 236 of the tuckers. Each tucker is pivotally mounted on a frame 238 which in turn is pivotally mounted concentrically with the end folders 222, that is, on the screw pivots 224 above mentioned. As shown in Figs. 25 and 26, each tucker 235 has laterally turned portions 239 hinged on pintles 241, at present formed from a single piece of wire 242, which pintles pass through parts of the frame 238 as shown in said figures, and are retained in position thereby. The pintles 241 are substantially radial with respect to the pivot pins 224. A contractile spring 243 interposed between and connected to each pair of tuckers at the rear of their hinged mounting, serves to normally hold the tuckers in the open position shown in Figs. 18, 19 and 20. It will be further observed that each tucker has a curved rear end 244, which in this open position, is disposed at the rear of an upstanding stop 245, fixed to the platen frame, as best shown in Fig. 19. Means is provided for swinging the tucker frames 238 inwardly, this being done by screw pins 246 which engage in slots 247, said screw pins being carried by said bars 248, as best shown in Figs. 18 and 20, joined together and held in rigid relation by cross-bars 249, best shown in Figs. 18 and 19. Said side bars 248 are adapted to be lifted by a lifter bar 251 operated by a cam 252 (Fig. 12) fixed to the shaft 74, it being observed that the lifter bar 251 has a head provided with ends 253, best shown in Figs. 15 and 24, which lie beneath the side bars 248 and are adapted to raise these side bars evenly at the four corners so as to uniformly operate the tuckers at both ends of the platen. It will be observed that normally the lifter ends 253 are withdrawn below the side bar 248 as shown in Fig. 19, so that the weight of these side bars holds the tucker frames 238 and the tuckers in the retracted open position herein shown. When the lifter bar 251 is raised by the action of the cam 252 as will be obvious, the tucker frames 238 will be swung inwardly about their respective pivots from the position shown in Fig. 19 to that in Fig. 22. The tuckers 235, however, remain open until their ends 244 strike the stops 245, and being retarded thereby cause the tuckers to swing inwardly on the respective hinges in a quick movement. In this particular instance, the tucking operation commences shortly after the ends of the wrapper have been folded in, so that as shown in Fig. 21, when the end folders 225 have reached the folding position the tuckers have already entered on the tucking operation.

Figure 38:
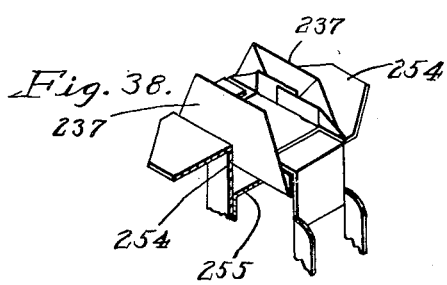

The next operation is to fold the projecting sides upwardly in the manner shown in Fig. 38. This is done by side folders 254, one being positioned at each side of the platen 218 and having opposed right angular parts providing a flat top portion and a vertical portion, the latter of which are rigidly connected by a U-shaped piece 255, it being noted Fig. 4, that the vertical portions of the parts 254 and 255 are disposed between the parts 226 and 248. This side folder unit normally rests on stop lugs 250 projected from each side of the platen frame 219, thereby holding the top horizontal portions or wings of this folder unit flush with the top of the platen 218. Upon raising this side folder unit, the projecting sides 237 of the wrapper which overlie said wings will be raised or folded upwardly by the latter over the tucked-in corners of the wrapper in the manner shown in Figs 23 and 38. The side folder is raised by a lifter bar 256 operated by a cam 257 fixed to the shaft 74, the lifter bar having a head 258 which engages the lower ends of the side lifter, as will be obvious. It will be noted at this point, however, that just after starting the side folding operation, that is, after the side folders 254 have been raised above the top of the platen and have started to fold the sides of the wrapper, the tuckers will be quickly released and retracted so as to be out of the way of the side folding operation. The end folders, are, however, still held in the folding position, as shown in Fig. 38.

There remains now the top folding operations for completely wrapping the bar. In the present instance, the upstanding sides 237 of the wrapper are folded down over the top after the wrapping unit has been indexed. Both the end and side folders 225 and 254 are held in their respective folding positions while the platen is being indexed the first time. To this end, one of the side folders is equipped with a shoe 259, (Figs. 4 and 29), which when the platen indexes, rides over the lifter head 258 and onto a track 261, shown in Figs. 4, 10, 17 and 29, and the end folder operating part 226 likewise rides over said head and track in advance of said shoe, thus holding both the end and side folders in the folded positions. The track 261 is formed integral with a bracket 262 bolted to the top of the main frame and shaped to provide an upstanding portion 263, which carries a package discharging means which will be presently described. The track 261 reaches from the point 264 adjacent to the wrapping lifter bars to the point 265 (Figs. 17 and 29) at which it steps down to a level 266 and terminates at 267. When the wrapping unit reaches the end of this first indexing movement which I term the second wrapping station, the part 226 rides off the track 261 onto the lower level 266, thereby withdrawing the end folders, this being shown in Fig. 29. The first top fold will be made at this station by a folding member in the form of a lever 268 pivotally mounted on a fixed pin 269 and having a side folding end 271 reaching the full length of the bar as shown also in Fig. 16. The upper end 272 of this lever is adapted to follow the under edge of the cylindrical cam 202, which normally holds the lever with its folding end 271 elevated as shown in dotted lines in Fig. 29. When a depression 273 in said cam is reached, the lever will enter it under pressure of a suitable spring 274, which imparts a rapid movement to the lever in a counter-clockwise direction viewing said figure, causing it to fold one of the upstanding sides of the wrapper down over the top of the bar, as shown in Fig. 39. There are three equally spaced depressions 273 in said cam, so arranged as to actuate the top folder lever immediately after each wrapping unit is moved to the second station. When the wrapping unit is again indexed, the top fold lever 268 will be retracted by the cylindrical cam as will be obvious.

The remaining upstanding side portion of the wrapper will be folded down as shown in Fig. 40 by a second top folder designated generally by 275, during the indexing of the unit from the second to the third station, said top folder 275 being best shown in Figs. 2 and 29. This folder pivotally suspended from a pin 276 carried by a part of the stationary support 263, is substantially flat from end to end and arcuate in shape as shown in dotted lines in Fig. 2, its leading end 277 being turned upwardly and its opposite end being cut away to provide an opening 278 for passage of the package discharging means, leaving narrow portions 279, which ride over the second top fold of the wrapper and hold it down until the wrapped bar has been picked up by said discharging means, which will be presently described. The tendency of the longer end of the top folder 275 to drop more than a few degrees beyond the position shown in Fig. 29, is limited by contact of the folder between its leading edge 277 and the pin 276 against the adjacent underside of the bracket carrying said pin. Viewing Fig. 29, it will be manifest that when the wrapping unit indexes to the third station, the remaining upstanding side portion of the wrapper will be brought into contact with the leading edge 277 of the second top folder 275, and will be carried under said folder and folded thereby, down over the first top fold. During the first part of this indexing movement the top folding lever 268 will be retracted and the shoe 259 will ride off the track 261, thereby partially lowering the side folders 254 so that the leading folder 254 will not interfere with the top folder 275 on the uppermost fold of the wrapper. After the indexing unit has been sufficiently advanced under the top folder 275 to insure its holding both top folds down in position, the shoe 259 will ride off the lower track 266, thereby allowing the side folders 254 to drop to their normal position and releasing the raised bar from any propelling connection other than frictional contact with the platen or the wrapping unit.

At the time the wrapped bar is thus released and while it is still riding over the top folder ends 279, it will be grasped by a pair of gripper plates forming part of a package-discharging means, which will be now described, reference being had particularly to Figs. 1, 2, 29, 31, 32 and 33. This means comprises a head 281 equipped with three equally spaced gripping units (Fig. 31), the head being fixed to a shaft 282 journaled in a bearing 283 carried by the above mentioned casting 263, and said shaft carrying a fixed bevel gear 284 meshing with a bevel gear 285 on the upper end of the indexing hub 221 (Fig. 1). This package-discharging device is located at a point between the second and third stations to which the wrapping units are indexed, these stations being identified by the position of the wrapping units as shown in Fig. 2. Each gripping device on the head 281 comprises a fixed and a movable gripper plate 286 and 287, respectively, and a helical spring 288 attached at its smaller end to the head between said gripper plates. Each movable plate 287 normally held in closed position against the head by a compression spring 289 is adapted to be positively moved to an open position shown in Fig. 33, by the action of a wedge 291, the shape of which is shown in Fig. 29. Each wedge is slidable in a slot 292 in the head and has an inclined side 293 engaging a complemental wall in the slot 292, and has also an oppositely inclined edge 294 disposed at the inner side of the head. An overhanging stop 295 on the outer end of the wedge prevents displacement thereof. The inclined edge 294 of each wedge is adapted to be brought into contact with a stationary cam 296, shown in Figs. 2, 29 and 33 as mounted on bearing 283 for the purpose of forcing the wedge outwardly and swinging the gripper 287 to an open position for widening the opening between the grippers, so that they may receive one of the wrapped bars. Viewing Fig. 2, it will be observed that the package-discharging head revolves in a plane intersecting the path of the wrapped bars, and that the gripper plates moving in a counter-clockwise direction viewing Fig. 31, pass between the top folder parts 279. Said discharging head 281 and the wrapping units are in such timed relation that during each indexing movement a wrapped package will be carried beneath said top fold portions 279 and between a pair of downwardly moving gripper plates, one of which has been opened as shown in Fig. 33, so as to clear the trailing end of the wrapped bar or package. After the package comes into registration with this gripping unit it will be brought into contact with the spring 288 thereof, which will be slightly compresed holding the folded ends of the wrapper down. After the package passes a vertical plane intersecting the center of the head 281, the gripper plate 287 will be released by the wedge 291 riding off the cam 296, and will be moved by pressure of the spring 289 into gripping engagement with the package. This engagement of the gripper plates 286 and 287 and of the spring 288 with the package is sufficient to hold the package which will be lifted from the platen and carried upwardly to the uppermost position shown in Fig. 31 upon the next succeeding indexing movement. Upon the following indexing movement, the package will be carried by the grippers into a delivery chute 297, which is cut away at 298 for clearance of the gripper plates. Viewing Figs. 2 and 31 it will be obvious that inasmuch as the ends of the package project beyond the grippers and will be carried onto the bottom wall of the chute, the package will be delivered from the grippers during the next succeeding movement, with the folded side down. The grippers slide off the package while it is resting on the bottom of the chute adjacent the point 298. Upon each indexing movement, a wrapped package will obviously be delivered into the chute which may be suitably arranged for conveying the packages away. A suitable work table 299 is supported on the frame between the cream cutting and feeding mechanism and the wrapping mechanism for convenience of the operator.

Figure 34:
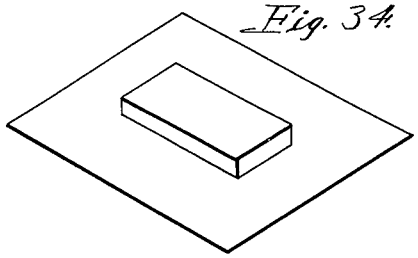

Referring again briefly to the general operation of the machine, it will be seen that the bars will be cut and fed to a loading or receiving station in succession, from which they will be picked up one at a time, dipped in a bath of coating material, raised, carried for a period in which the coating has an opportunity to harden, and then fed at a wrapping station onto a wrapper as shown in Fig. 34, and into a wrapping unit or box to the position shown in Fig. 35; that the wrappers are fed in succession to said wrapping station and cut off; and that the wrapping units will be moved in succession to respectively receive the wrapper and bar at the wrapping station and will perform the successive wrapping operations shown in Figs. 36 to 40 inclusive, and carry the wrapped bar to the discharging means which picks up and delivers it into a delivery chute. It will also be manifest that all of these operations are automatically performed in the proper sequence. Due to the time required for the coating material to harden, the present machine is operated at a speed which produces about 80 dozen wrapped ice cream bars an hour, although in practice it may be speeded up to about 100 dozen per hour. The wrapping mechanism when used separately in a machine for wrapping only may be operated at a higher speed than in the present case.

The wrapping mechanism herein illustrated and described has been used successfully in the wrapping of chocolate coated ice cream bars, as indicated above. In the handling of such a fragile product it is most important not to have the coating cracked or crushed by contact with the wrapping machanism. The fact that the side tuckers have a gathering motion as they are brought into operative position, the winglike members constituting the tuckers being brought toward one another as they are moved inwardly toward the bar, avoids any danger of damage to the bar, because the bar will actually be moved into proper position by the tuckers themselves if it happens to be improperly placed on the wrapper. In the wrapping mechanism which would rely upon accurate location of the bar to begin with, it is easily understood that the parts of the mechanism in moving in a predetermined path would be bound to damage the bars that did not happen to lie in exactly the right position. In the wrapping of such a product, the kind of wrap is also important. For instance, while butter or cheese may be wrapped successfully for folding the ends in from the four sides, because the folded portions will adhere more or less to the bar or cake, such a wrap will not do for a chocolate coated ice cream bar. With such a product, the wrap should be of such a form that the wrapper will be kept from unfolding principally because of the way in which it is folded, it being impossible to rely upon the wrapper adhering to the bar and just as much out of the question to use an adhesive. In the present case, the wrapping mechanism makes the two end folds, then tucks in the wrapper at both ends on opposite sides of the bar to hold the end folds in place, then folds up the two sides to keep the tucks in place, and finally folds over the upwardly projecting side portions down over the top of the bar to complete the wrapper. In that way, the folds show only on the top of the bar and this is the back of the bar, the printed matter being on the other face. The fact that the wrapper is gathered up at the ends and both sides as just indicated means complete protection for the bar so that it is perfectly sanitary to handle. When a foil wrapper is used, which will take a nice crease, it is found that the wrapping of the bar in the manner herein described positively eliminates any danger of the bar becoming unwrapped accidentally after it is discharged from the wrapping mechanism.

It should be understood that the apparatus illustrated in the drawings is simply one example of the principles and objects of my invention and that in practice many changes may be made in the construction and arrangement without departing from the spirit and scope of the invention as expressed in the appended claims.

I claim:

1. In a wrapping mechanism, the combination of a platen providing a flat top surface for support of a wrapper and a bar thereon to be wrapped, the platen having projecting end portions, end folders pivoted on said end portions for swinging movement on substantially horizontal axes inwardly with respect to the opposite ends of the platen, said end folders having angular folding top portions arranged to bring the ends of the wrapper over the top of the ends of the bar, a pair of side tuckers cooperating with each of the end folders and disposed on opposite sides thereof for tucking down the end folds at opposite sides of the bar, said tuckers being movable into operative position in the swinging movement of the end folders and being mounted on said folders for pivotal movement on substantially vertical axes, means for communicating swinging movement to the end folders inwardly and outwardly relative to the ends of the platen, means for swinging the tuckers toward each other in the inward movement of said end folders and away from each other in the outward movement thereof, and means at opposite sides of the platen for folding the side portions of the wrapper about the bar.

2. In a wrapping mechanism, the combination of a platen having a substantially horizontal top portion for supporting a wrapper and a bar thereon to be wrapped, end folders pivotally mounted at opposite ends of the platen for inward and outward swinging movement relative to the ends of the platen on substantially horizontal axes, the end folders having angular top portions for bringing the ends of the wrapper over the ends of the bar, a pair of side tuckers cooperating with each of the end folders, the tuckers being disposed on opposite sides of each end folder and mounted for swinging movement on substantially vertical axes, means for communicating inward and outward movement to the end folders, means for communicating swinging movement to the side tuckers inwardly toward each other for tucking down the end folds at opposite sides of the bar, and means at opposite sides of the platen for folding the side portions of the wrapper about the bar.

3. In a wrapping mechanism, the combination of a platen having a substantially horizontal top portion for supporting a wrapper and a bar thereon to be wrapped, means for folding the ends of the wrapper over the ends of the bar leaving the side portions of the wrapper projecting at opposite sides of the bar, a pair of side tuckers pivotally mounted at each end of the platen at opposite sides thereof for swinging movement on substantially vertical axes, means for communicating swinging movement to said tuckers inwardly toward each other whereby to tuck down the end folds at opposite sides of the bar, and means at opposite sides of the platen for folding the projecting side portions of the wrapper about the bar.

4. In a wrapping mechanism, the combination of a platen having a substantially horizontal top portion for supporting a wrapper and a bar thereon to be wrapped, a pair of end folders disposed at opposite ends of the platen and swingable on substantially horizontal axes inwardly and outwardly toward and away from the platen relative to the ends of the platen, a pair of side tuckers pivotally mounted on each of the end folders at opposite sides thereof for swinging movement on substantially vertical axes, means for communicating swinging movement to the end folders inwardly toward the opposite ends of the platen, means for simultaneously communicating swinging movement to the tuckers toward each other whereby to tuck down the end folds of the wrapper at opposite sides of the bar, and means for folding the projecting side portions of the wrapper about the bar.

5. In a wrapping mechanism, the combination of a platen having a substantially horizontal top portion for supporting a wrapper and a bar thereon to be wrapped, said platen having horizontally projecting end portions, a pair of end members at opposite ends of the platen pivoted on the end portions thereof on substantially parallel horizontal axes to swing inwardly and outwardly relative to the ends of the platen, a pair of tuckers mounted on each of the end members at opposite sides thereof on substantially vertical axes to swing toward each other from opposite sides of the platen, said tuckers having rear end portions, said tuckers being normally disposed with their front end portions spread apart and with their rear end portions extending toward each other behind the end members when the end members are in retracted position, means for communicating swinging movement to the end members inwardly from retracted position toward the ends of the platen, projections provided on the end portions of the platen reaching upwardly behind the end members and arranged for engagement with the rear end portions of said tuckers, whereby to swing the tuckers inwardly toward each other simultaneously in the inward swinging movement of said end members, whereby to tuck in the end portions of the wrapper about the ends of the bar from opposite sides of the bar, and means at opposite sides of the platen for folding the projecting side portions of the wrapper about the bar.

6. A wrapping mechanism as set forth in claim 5 including spring means cooperating with each pair of tuckers tending normally to hold them with their front portions spread apart, the said tuckers being brought together by engagement of the rear end portions with said projections and against the action of the spring means.

7. In a wrapping mechanism, the combination of a platen having a substantially horizontal top portion for supporting a wrapper and a bar thereon to be wrapped, said platen having substantially horizontally projecting end portions, end folders disposed at opposite ends of the platen having side flanges thereon for pivotally mounting the same on the end portions of the platen on substantially horizontal axes for swinging movement inwardly and outwardly relative to the ends of the platen, said end folders being arranged to fold the ends of the wrapper over the top of the ends of the bar, means cooperating with the flanges of the end folders in spaced relation to the aforesaid pivots and operable from beneath the platen for simultaneously moving the end folders inwardly toward the ends of the platen and outwardly toward retracted position, a pair of side tuckers for each of the end folders mounted thereon at opposite sides thereof for swinging movement in substantially vertical planes, means on the end portions of the platen cooperating with said tuckers to swing them inwardly toward each other in the inward swinging movement of the end folders toward the ends of the platen whereby to tuck down the end folds of the wrapper at opposite sides of the bar, and means at opposite sides of the platen for folding the projecting side portions of the wrapper about the bar.

8. A wrapping mechanism as set forth in claim 7 wherein the last mentioned means comprises side members, the tops of which are normally disposed level with the plane of the top of the platen, said side members being movable vertically on opposite sides of the platen from beneath said platen whereby to fold up the projecting side portions of the wrapper against the sides of the bar.

9. In a wrapping mechanism as set forth in claim 7 wherein the last mentioned means comprises side members, the tops of which are normally disposed level with the plane of the top of the platen, said side members being movable vertically on opposite sides of the platen from beneath said platen whereby to fold up the projecting side portions of the wrapper against the sides of the bar, the wrapping mechanism including other means operable from above the platen for folding down the upwardly projecting side portions of the wrapper onto the top of the bar.

10. In a wrapping mechanism, the combination of a platen having a substantially horizontal top portion for supporting a wrapper with a bar thereon to be wrapped, the platen having substantially horizontally projecting end portions, a pair of end folders pivotally mounted on the end portions having angular upper ends extending inwardly toward each other from opposite ends of the platen, means for communicating inward swinging movement to said members whereby to fold the ends of the wrapper over the ends of the bar, side tuckers pivotally mounted relative to the end portions of the platen for inward swinging movement toward the ends of the platen in a substantially horizontal plane, said tuckers being further mounted for pivotal movement relative to the opposite sides of said end folders for swinging movement in substantially vertical planes inwardly toward each other from opposite sides of the platen, means for communicating inward swinging movement to said end folders and said side tuckers, means for communicating swinging movement to the tuckers inwardly toward each other simultaneously with the inward swinging movement of said tuckers toward the ends of the platen, and means at opposite sides of the platen for folding the projecting side portions of the wrapper about the bar.

11. In a wrapping mechanism, the combination of a platen having a substantially horizontal top portion for supporting a wrapper and a bar thereon to be wrapped, a pair of opposed end folders pivotally mounted at opposite ends of the platen for swinging movement in a substantially horizontal plane toward and away from the ends of the platen, tuckers pivotally mounted on opposite sides of the end folders for swinging movement in substantially vertical planes relative to said end folders inwardly toward each other from opposite sides of the platen, means for communicating swinging movement to the end folders inwardly toward opposite ends of the platen, means for simultaneously communicating swinging movement to the tuckers inwardly toward each other whereby to fold the opposite ends of the wrapper about the sides of the bar, the said end folders being narrower than the platen and the tuckers being arranged to occupy positions alongside the end folders with the outer sides thereof substantially flush with the sides of the platen, and side folders arranged to be brought up into operative position flush with the sides of the platen whereby to fold the projecting side portions of the wrapper against the sides of the bar.

12. In a wrapping mechanism as set forth in claim 11 wherein the side folders have right angular parts providing vertical portions disposed alongside of the platen and movable vertically relative to the opposite sides of said platen and substantially flush with the same, and horizontal top portions, the said top portions being normally disposed flush with the top of the platen until said folders are raised to operative position, the wrapping mechanism including means operable in a plane flush with the top portions of said side folders in the raised position thereof for folding the projecting portions of the wrapper onto the top of the bar.

13. In a wrapping mechanism, the combination of a platen having a substantially horizontal top portion for supporting a rectangular wrapper and a four-sided bar or the like thereon to be wrapped, means for folding two ends of the wrapper over the adjacent ends of the bar leaving portions of the wrapper projecting from the other two ends of the bar, a pair of tuckers pivotally mounted at each of the first mentioned ends of the platen adjacent the corners thereof for swinging movement on substantially vertical axes, means for communicating swinging movement to said tuckers inwardly toward each other whereby to tuck down the projecting portions of the wrapper against the other ends of the bar, and means adjacent the last mentioned ends of the platen for folding the projecting portions of the wrapper about the bar.

FRED L. BORCHERT.